Patented Oct. 17, 1933

1,930,923

UNITED STATES PATENT OFFICE 1,930,923

ALKYL ORTHO-CRESOL

Walter G. Christiansen, Bloomfield, N. J., and William S. Jones, Brooklyn, N. Y., assignors to E. R. Squibb & Sons, New York, N. Y., a corporation of New York No Drawing. Application August 23, 1930
Serial No. 477,461

12 Claims. (Cl. 260—154)

This invention relates to alkyl ortho-cresols, by which term is meant herein ortho-cresol having an alkyl linked to a carbon atom of the hydroxylated benzene nucleus.

For convenience, "hyper-tetra-carbon alkyl" will designate alkyls containing more than four carbon atoms; and "equi-carbon-acyl" is used to signify an acyl containing as many carbon atoms as the alkyl to be ultimately introduced into the ortho-cresol.

We have found that alkyl, particularly hyper-tetra-carbon-alkyl, ortho-cresols possess valuable bactericidal properties; and it is the object of this invention to provide hyper-tetra-carbon-alkyl ortho-cresols and a method of preparing alkyl ortho-cresols generally.

According to this invention the method of preparing an alkyl ortho-cresol comprises converting ortho-methyl anisol successively into the equi-carbon-acyl ortho-methyl anisol—in which the acyl is linked to a carbon atom of the hydroxylated benzene nucleus—, the alkyl ortho-methyl anisol, and the alkyl ortho-cresol; e. g., acylating by treating the ortho-methyl anisol with an equi-carbon-acyl halide in the presence of anhydrous aluminum chloride; reducing the acyl to the alkyl by treating the equi-carbon-acyl ortho-methyl anisol with hydrochloric acid solution and amalgamated zinc; and changing the methoxyl into a hydroxyl by treating the alkyl ortho-methyl anisol with hydriodic acid.

As an example, 2-methyl 4-normal-amyl phenol may be prepared as follows:

A (1). To a solution of 105 g. of ortho-methyl anisol in 100 g. of normal-valeryl chloride, 125 g. of anhydrous aluminum chloride is added in small portions with brisk agitation, the heat of reaction being dissipated by holding the flask under running water. When hydrochloric acid ceases to be evolved, the reaction mixture is warmed on the steam-bath and heating is continued for about 100 minutes or until no more hydrochloric acid is given off. Now the mixture is cooled, poured into 200 cc. of equal volumes of crushed ice and hydrochloric acid solution, and extracted with 100 cc. of benzene. Then the benzene solution is washed with dilute sodium carbonate solution and dried, the benzene evaporated off, and the residue subjected to fractional distillation under vacuum. The 3-methyl 4-methoxy normal-valerylphenone boils at a temperature of between 151 and 155° C. under a pressure of 5 mm.

A (2). In an alternative, and preferable (because producing a larger yield), mode of performing this first step, 44 g. of anhydrous aluminum chloride is added to a solution of 25 g. of normal-valeryl chloride in 50 cc. of carbon disulfide and the mixture refluxed gently and stirred, while adding gradually during fifteen minutes 30 g. of ortho-methyl anisol. After heating for an additional hour, the carbon disulfide is distilled off and the hot liquid residue poured upon a mixture of ice and hydrochloric acid solution, and extracted with ether. Then the ether solution is washed successively with dilute hydrochloric acid solution and water, and is dried, the ether is evaporated off, and the residue fractionally distilled in vacuo.

B. To 15 g. of 3-methyl 4-methoxy normal-valerylphenone are added 20 cc. of 18% hydrochloric acid solution and 5 g. of amalgamated zinc, and the mixture is agitated and heated under reflux for about twenty-four hours, additional acid and amalgamated zinc being introduced from time to time. The solution is alkalized with sodium hydroxide and extracted with ether, the ether solution is washed and dried, and the ether is evaporated off, leaving 2-methyl 4-normal-amyl anisol.

C. Together with 5 g. of 2-methyl 4-normal-amyl anisol, 25 g. of hydriodic acid of the specific gravity of 1.5 and 50 cc. of glacial acetic acid are refluxed for about six hours; then the solution is cooled, treated with 300 cc. of water, and extracted with five 100-cc. portions of ether. The ether solutions are united and dried, the ether evaporated off, and the residue fractionally distilled in vacuo to obtain 2-methyl 4-normal-amyl phenol. This is a liquid soluble in aqueous sodium hydroxide and in the common organic solvents, and boiling at between 104 and 105° C. under a pressure of between 1 and 1.5 mm.

It is to be understood that the embodiments herein described in detail are merely illustrative and by no means limitative of the invention, which may assume various other forms—for instance as to the particular alkyl introduced and its position and the specific procedures followed—within the scope of the appended claims.

We claim:

1. In the preparation of 4-alkyl ortho-cresol, the step of converting ortho-methyl anisol into the equi-carbon-acyl ortho-methyl anisol.

2. In the preparation of 4-alkyl ortho-cresol, the steps of converting ortho-methyl anisol successively into the equi-carbon-acyl ortho-methyl anisol and the alkyl ortho-methyl anisol.

3. Preparing 4-alkyl ortho-cresol by converting ortho-methyl anisol successively into the equi-carbon-acyl ortho-methyl anisol, the alkyl ortho-methyl anisol, and the alkyl ortho-cresol.

4. The method of preparing 4-alkyl ortho-cresol that comprises: acylating ortho-methyl anisol to convert it into the equi-carbon-acyl ortho-methyl anisol, by treating the ortho-methyl anisol with an equi-carbon-acyl halide in the presence of anhydrous aluminum chloride; reducing the acyl to convert the equi-carbon-acyl ortho-methyl anisol into the alkyl ortho-methyl anisol, by treating the equi-carbon-acyl ortho-methyl anisol with hydrochloric acid solution and amalgamated zinc; and changing the methoxyl into a hydroxyl to convert the alkyl ortho-methyl anisol into the alkyl ortho-cresol, by treating the alkyl ortho-methyl anisol with hydriodic acid.

5. Preparing 4-amyl ortho-cresol by converting ortho-methyl anisol successively into methyl methoxy valerylphenone, amyl ortho-methyl anisol, and amyl ortho-cresol.

6. The method of preparing 4-amyl ortho-cresol that comprises: converting ortho-methyl anisol into methyl methoxy valerylphenone by treating the ortho-methyl anisol with a valeryl halide in the presence of anhydrous aluminum chloride; converting the methyl methoxy valerylphenone into amyl ortho-methyl anisol by treating the methyl methoxy valerylphenone with hydrochloric acid solution and amalgamated zinc; and converting the amyl ortho-methyl anisol into amyl ortho-cresol by treating the amyl ortho-methyl anisol with hydriodic acid.

7. Preparing 2-methyl 4-hyper-tetra-carbon-alkyl phenol by converting ortho-methyl anisol successively into the 2-methyl 4-equi-carbon-acyl anisol, the 2-methyl 4-hyper-tetra-carbon-alkyl anisol, and the 2-methyl 4-hyper-tetra-carbon-alkyl phenol.

8. The method of preparing 2-methyl 4-hyper-tetra-carbon-alkyl phenol that comprises: acylating ortho-methyl anisol to convert it into the 2-methyl 4-equi-carbon-acyl anisol, by treating the ortho-methyl anisol with an equi-carbon-acyl halide in the presence of anhydrous aluminum chloride; reducing the acyl to convert the 2-methyl 4-equi-carbon-acyl anisol into the 2-methyl 4-hyper-tetra-carbon-alkyl anisol, by treating the 2-methyl 4-equi-carbon-acyl anisol with hydrochloric acid solution and amalgamated zinc; and changing the methoxyl into a hydroxyl to convert the 2-methyl 4-hyper-tetra-carbon-alkyl anisol into 2-methyl 4-hyper-tetra-carbon-alkyl phenol, by treating the 2-methyl 4-hyper-tetra-carbon-alkyl anisol with hydriodic acid.

9. In the preparation of 2-methyl 4-normal-amyl phenol, the step of converting ortho-methyl anisol into 3-methyl 4-methoxy normal-valerylphenone.

10. In the preparation of 2-methyl 4-normal-amyl phenol, the steps of converting ortho-methyl anisol successively into 3-methyl 4-methoxy normal-valerylphenone and 2-methyl 4-normal-amyl anisol.

11. Preparing 2-methyl 4-normal-amyl phenol by converting ortho-methyl anisol successively into 3-methyl 4-methoxy normal-valerylphenone, 2-methyl 4-normal-amyl anisol, and 2-methyl 4-normal-amyl phenol.

12. The method of preparing 2-methyl 4-normal-amyl phenol that comprises: converting ortho-methyl anisol into 3-methyl 4-methoxy normal-valerylphenone by treating the ortho-methyl anisol with a normal-valeryl halide in the presence of aluminum chloride; converting the 3-methyl 4-methoxy normal-valerylphenone into 2-methyl 4-normal-amyl anisol by treating the 3-methyl 4-methoxy normal-valerylphenone with hydrochloric acid solution and amalgamated zinc; and converting the 2-methyl 4-normal-amyl anisol into 2-methyl 4-normal-amyl phenol by treating the 2-methyl 4-normal-amyl anisol with hydriodic acid.

WALTER G. CHRISTIANSEN.
WM. S. JONES.